United States Patent [19]

Johnson et al.

[11] Patent Number: 5,577,342

[45] Date of Patent: Nov. 26, 1996

[54] RODENT CONTROL GLUE BOARD

[75] Inventors: Daniel C. Johnson, Madison; Richard L. Leyerle, Burlington, both of Wis.

[73] Assignee: Bell Laboratories, Inc., Madison, Wis.

[21] Appl. No.: 440,006

[22] Filed: May 12, 1995

[51] Int. Cl.⁶ .................................................. A01M 1/14
[52] U.S. Cl. ................................................ 43/114; 43/58
[58] Field of Search ......................... 43/58, 114; 53/399, 53/419; 206/564

[56] References Cited

U.S. PATENT DOCUMENTS

| | | | |
|---|---|---|---|
| 731,843 | 6/1903 | Bierley. | |
| 2,138,926 | 12/1938 | Karfiol | 43/114 |
| 3,605,374 | 9/1971 | Mueller et al. | 53/399 |
| 4,244,134 | 1/1981 | Otterson | 43/58 |
| 4,438,584 | 3/1984 | Baker et al. | 43/114 |
| 4,685,244 | 8/1987 | Marks | 43/58 |

FOREIGN PATENT DOCUMENTS 581474  10/1946  United Kingdom.

OTHER PUBLICATIONS

"Active™ Rat Boards" —Pest Control—Undated.
"Rats and Mice Eliminated" —Pest Control—Sep. 1976.
"Now, Trap-Stik™ in trays. Drop'em in their tracks," Southern Mill Creek Products Company, Inc., Tampa, Florida—Undated.
"Rodent Control Product and Label Guide", 1994 Edition, Bell Laboratories, Inc., Madison, Wisconsin, pp. 1, 17, 22 and 23.

Exhibits A, B, C, D, and E—Photographs of PIC® mouse glue traps.

Primary Examiner—P. Austin Bradley
Assistant Examiner—Allyson D. Nelson
Attorney, Agent, or Firm—Lathrop & Clark

[57] ABSTRACT

Adhesive rodent glue boards are compactly packaged in a flexible plastic wrapper. Thermoformed glue-containing boards have protruding dam walls which extend upwardly from a base wall to define a reservoir for rodent-entrapping glue. The boards have a peripheral rim below the level of the glue. A paperboard sleeve extends between the rim of a first board and the rim of an overlying, inverted, second board, to maintain the glue of the two boards in spaced, non-contacting, relation. The glue extends to a level proximate the upper lip of the dam wall, allowing the board to present a lower profile to targeted rodents.

10 Claims, 5 Drawing Sheets

5,577,342

RODENT CONTROL GLUE BOARD

FIELD OF THE INVENTION

This invention relates to devices for removing targeted rodents, in general, and in particular to devices which utilize an adhesive substance for entrapping rodents.

BACKGROUND OF THE INVENTION

Throughout history, rodents such as mice and rats have been a persistent pest, consuming food supplies, soiling human habitations and workplaces, and spreading contaminants and disease. Rodents may be killed by the placement of poison in a form attractive to the rodent. However, in certain applications poisoned bait may be ineffective, for example in a granary where attractive rodent food is omnipresent. In other applications, poison may be unacceptable because of the close proximity to human food or non-target species, including pets.

Mechanical traps which use stored kinetic energy to enclose or crush the rodent have the advantage of retaining the dead rodent at a specific site for disposal. However, the moving parts of a mechanical trap add to the cost of manufacture.

Adhesive devices have been developed which present an expanse of highly retentive glue along a path frequented by rodents. A rodent making contact with the adhesive will be held and prevented from departure. Eventually the rodent will become suffocated in the adhesive, or will otherwise die. The glue-containing board and dead rodent may then be disposed of as a single unit.

Convenient packaging and shipment of glue boards is of great concern. The adhesive nature of the device means that it must be shielded from contact with dirt and debris prior to use, lest its adhesive properties by reduced. Furthermore, for convenience to the user, the adhesive should be shielded from contact with clothing, hands, furniture, etc., until ready to be placed along a rodent runway.

Prior art glue boards have employed thermoformed plastic sheets to contain the adhesive, and these sheets have had a flange which extends significantly above the surface of the entrapping glue. Hence two glue boards may be placed flange to flange, thereby spacing the glue of each from adhesive contact. The spacing of the flange above the glue surface, however, undesirably adds to the thickness of the unit, and also may permit the entry of dirt or debris.

What is needed is an adhesive control device for rodents which allows compact and convenient packaging, and which supports ready rodent entrapment.

SUMMARY OF THE INVENTION

The adhesive rodent control glue board of this invention is a compact unit which presents minimal obstacles to targeted rodent entrapment. The glue board is comprised of a thermoformed thermoplastic board which has a glue reservoir defined by a base wall and by dam inner walls which extend upwardly from the base wall. Dam outer walls extend downwardly from the dam inner walls and terminate in a peripheral outwardly extending rim which defines a plane below the glue retained in the reservoir. Glue fills the reservoir and is thus advantageously presented for rodent entrapment. Two glue boards may be formed into a glue board assembly for shipment and storage by inverting one glue board and placing it over the other. A structural paperboard sleeve engages the rims of the two glue boards and supports one glue board in spaced relation from the other. The assembly may be placed within a plastic film wrapper or sheath for retail sales. In an alternative embodiment a narrow skirt extends upwardly from the peripheral rim and restricts sideward displacement of the sleeve.

It is an object of this invention to provide a rodent glue board which presents minimal physical obstacles to the entrapment of targeted rodents.

It is a further object of the present invention to provide an assembly of multiple glue boards for shipment and storage which simultaneously supports, spaces and protects the glue boards.

It is another object of the present invention to provide rodent control glue boards which may be economically packaged and shipped.

It is also an object of the present invention to provide two rodent control glue boards which may be packaged together and prevented from becoming adhered to one another within the package.

Further objects, features and advantages of the invention will be apparent from the following detailed description when taken in conjunction with the accompanying drawings.

DESCRIPTION OF THE PREFERRED EMBODIMENT

Figure 1:
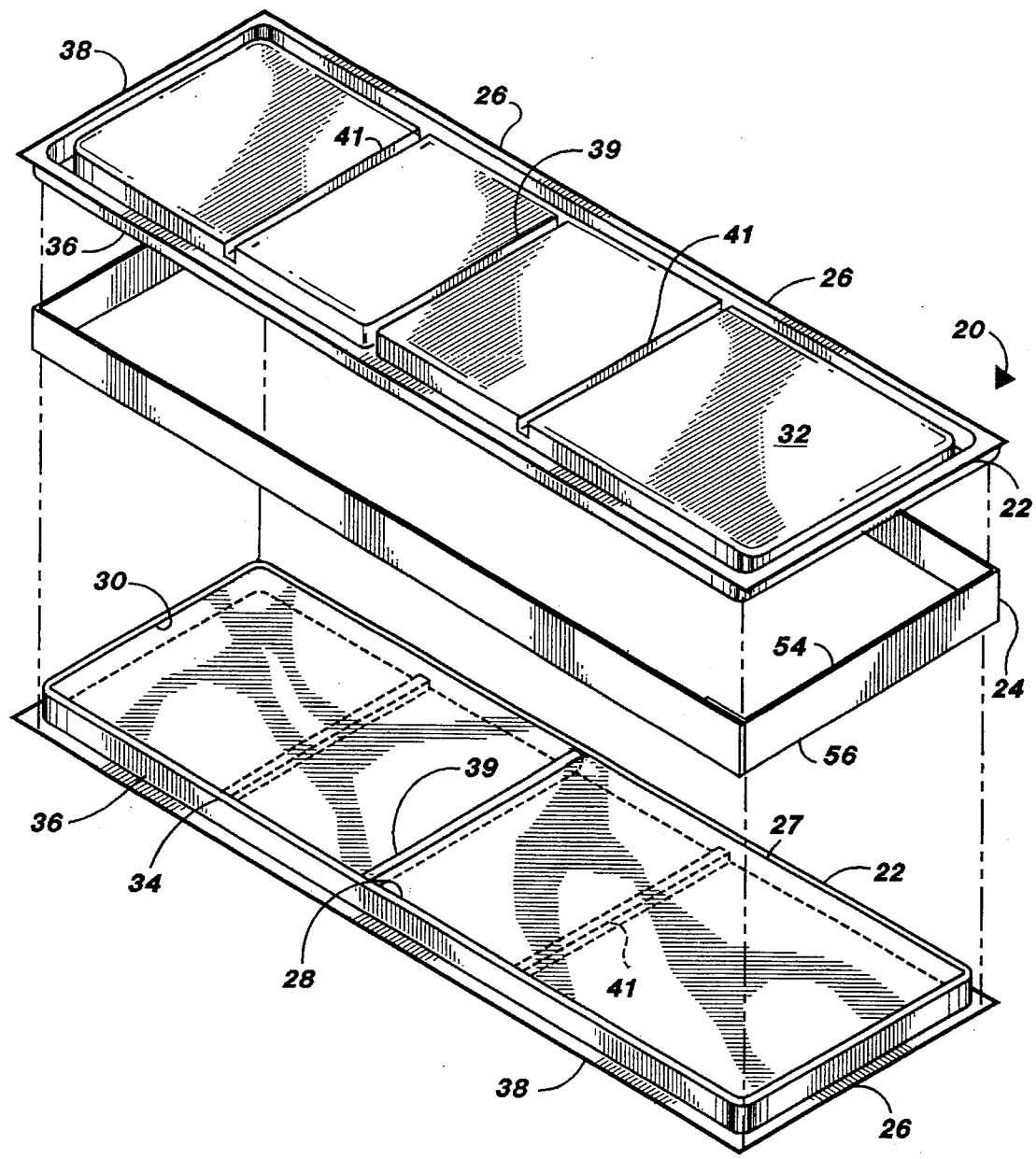
FIG. 1 is an exploded isometric view of a shipping and storage assembly of two of the glue boards and the paperboard sleeve of this invention.
Figure 2:
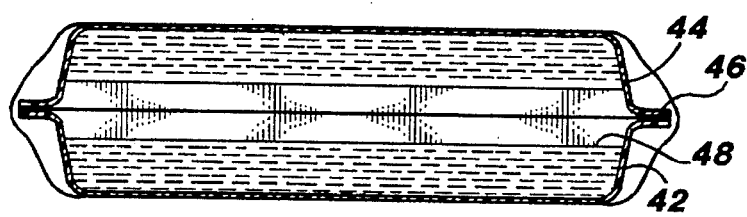
FIG. 2 is a cross-sectional view of a packaged assembly of two prior art glue boards.
Figure 3:
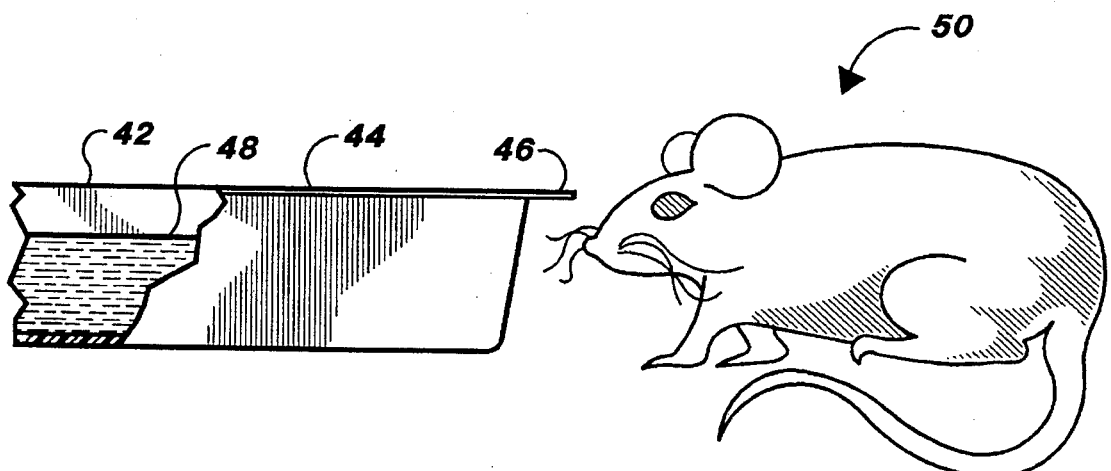
FIG. 3 is a fragmentary side elevational view, partly broken away in section, of a prior art glue board in relation to a rodent.
Figure 4:
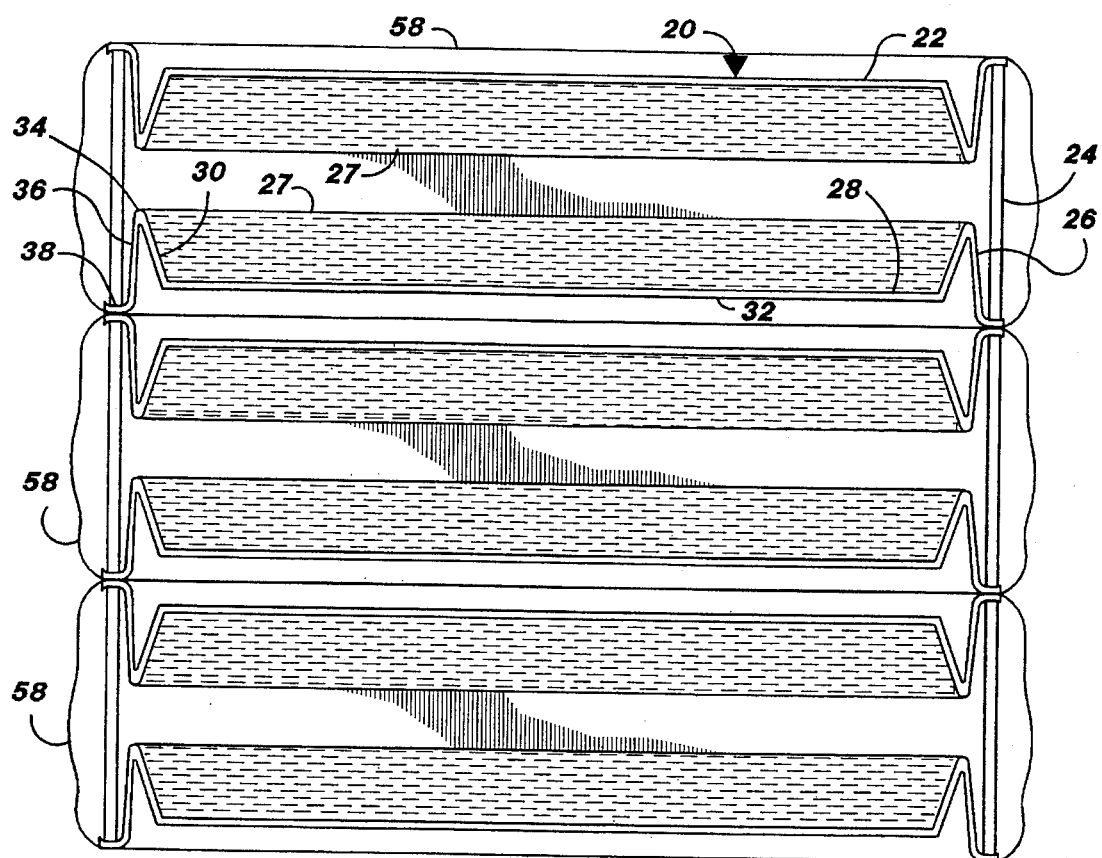
FIG. 4 is a cross-sectional view of a plurality of stacked glue board assemblies of this invention.
Figure 5:
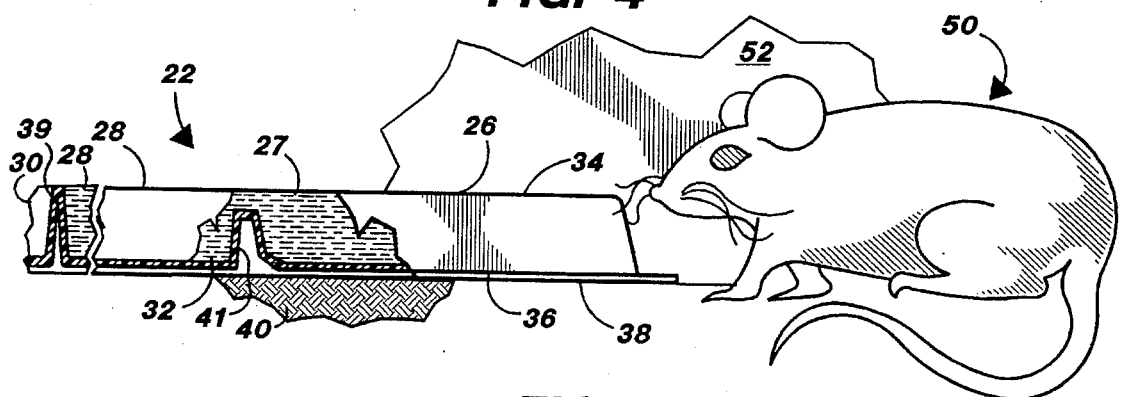
FIG. 5 is a fragmentary side elevational view, partly broken away in section, of the glue board of this invention in relation to a rodent.
Figure 6:
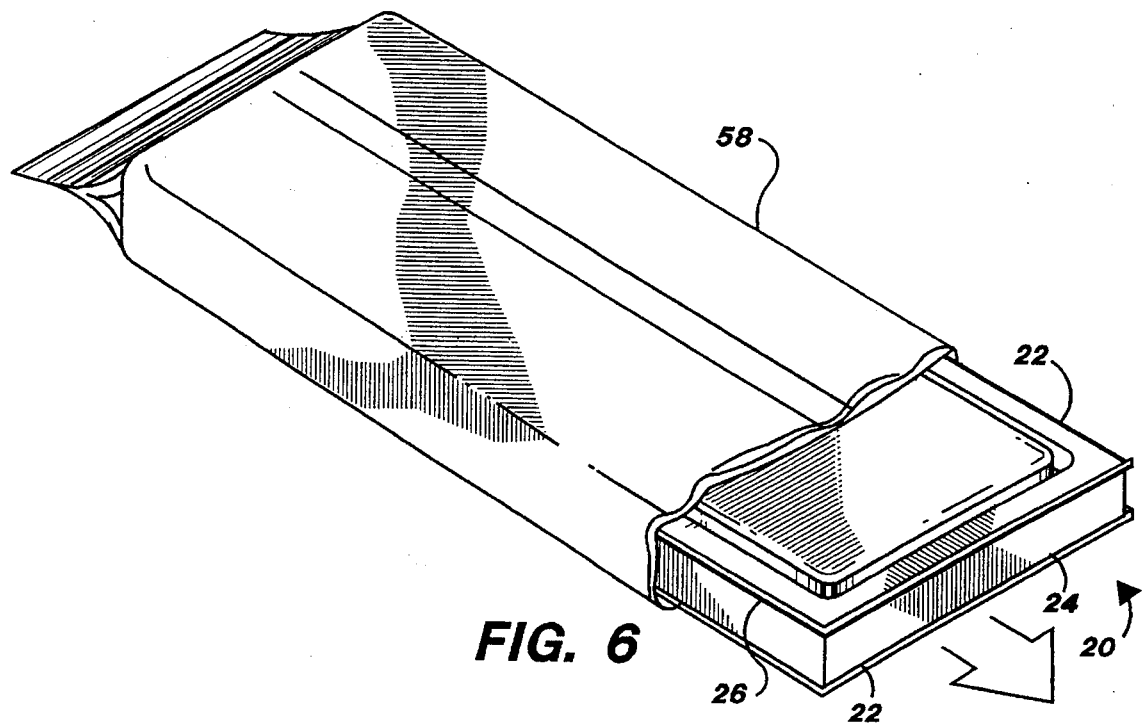
FIG. 6 is an isometric view illustrating removal of two glue boards from the package of FIG. 4.

Referring more particularly to FIGS. 1–8, wherein like numbers refer to similar parts, a multiple rodent control glue board assembly 20 is shown in FIGS. 1, 4, and 6. The assembly 20 is comprised of two adhesive glue boards 22 connected in spaced relation to one another by a structural paperboard sleeve 24.

Each glue board 22 is comprised of a thermoformed thermoplastic board 26 which is filled with a quantity of rodent entrapping glue 27. The board 26 is preferably formed of 0.026 inch polystyrene plastic, but may be thermoformed of any suitable plastic material. The glue may be any appropriate hotmelt pressure sensitive adhesive which is sufficiently adhesive to capture a rodent, and yet sufficiently viscous to be retained within the board 26 at field temperatures expected to be encountered by the glue board 22, in storage, shipment and use.

Figure 8:
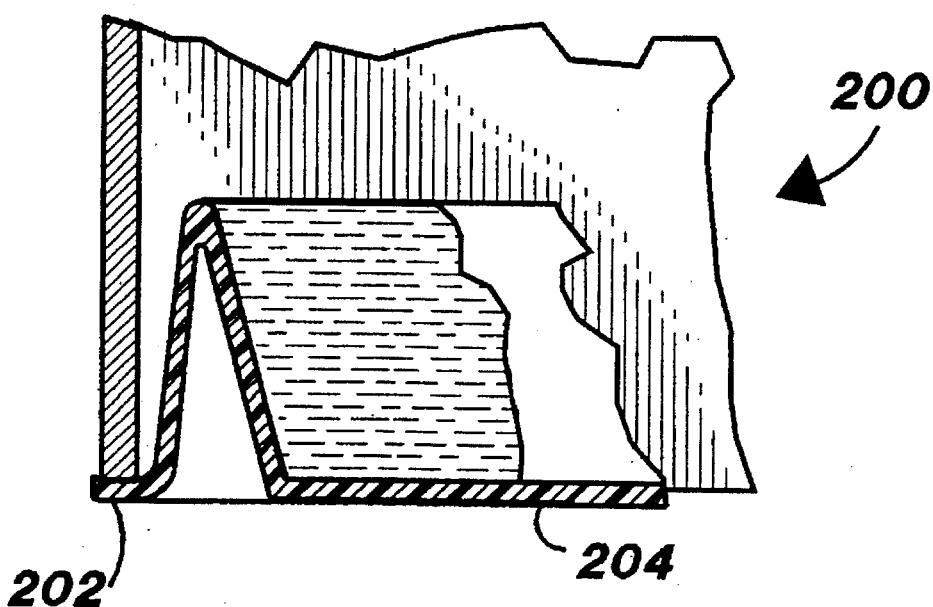
FIG. 8 is a fragmentary cross-sectional view of an alternative embodiment glue board assembly of this invention, having base walls which are at the same level as the board rib.

The board 26, as shown in FIGS. 1 and 5, has an adhesive reservoir 28 which is defined between dam inner walls 30. The dam inner walls 30 extend upwardly from a board base wall 32 which underlies and supports the glue 27. As shown in FIG. 5, the dam inner walls are topped by a narrow peripheral lip 34. The lip is preferably curved. Dam outer walls 36 extend downwardly from the lip 34 and terminate in an outwardly extending peripheral rim 38. The rim 38 extends in a generally horizontal plane and supports the glue reservoir above the support surface 40, such as a concrete floor as shown in FIG. 5. Alternatively, as shown in FIG. 8, a glue board 200 may have a rim 202 which is at the same level as the base wall 204.

A prior art glue board 42, shown in FIGS. 2 and 3, has a plastic tray 44 with a flange 46 extending outwardly above the glue 48. The flange 46 on the prior art unit 42 served to space one glue board 42 from an inverted glue board 42 which was positioned on top of the first glue board for packaging and shipping as shown in FIG. 2. As shown in FIG. 3, this elevated flange 46 presented a potential obstacle to a rodent 50 approaching the glue board 42. The flange 46 extends above the glue 48, thus requiring the rodent to step over the flange before reaching the glue. An inherent problem with this prior art design is that to adequately separate the glue surfaces of two glue boards, the flange 46 must be above the glue surface. But it is just this elevated flange which presents a hostile obstacle to the approaching rodent.

The glue board 22 of this invention, as shown in FIG. 5, does not have any structure above the level of the glue 27 for spacing purposes, and hence allows the side walls to be no higher than needed to retain the glue within the board 26. The glue board 22 thus presents less of an obstacle to a rodent 50 than a prior art glue board with the same thickness of glue contained therein.

The glue board 22 is preferably manufactured in a continuous process, with a plurality of boards 26 being thermoformed from sheet thermoplastic material, filled through injection nozzles with hotmelt adhesive, cooled, and packaged in a stepwise manner. To retain the stiffness and horizontal orientation of the board 26 against the forces of the cooling glue 27, the thermoformed board 26 is preferably provided with one or more stiffening ribs 39, 41. The ribs 39, 41 provide a means for resisting warping of the board 26 and extend between two parallel dam inner walls 30, preferably bridging the narrow width of the rectangular board 26. The ribs 39, 41 are preferably of lower height than the peripheral lip 34, and may be of any appropriate height to stiffen the board 26 as needed. However, in a preferred embodiment, a central rib 39 is a narrow rectangular rib which is approximately the same height as the glue 27, while other rectangular ribs 41 are submerged within the glue 27. The ribs 39,41 serve a secondary function of providing a visual indication during manufacture of glue level within the glue board 22. If the glue is being deposited at too low a level, the ribs 41 will be exposed and immediately visible, allowing an operator to quickly adjust the production equipment to obtain the proper glue levels.

As best shown in FIGS. 1 and 4, two glue boards 22 of this invention may be connected into a packaged assembly 20 by the insertion of a structural paperboard sleeve 24 between the two. Because it is the sleeve 24, not the dam walls 30, 36, which separates the two connected glue boards 22, the dam walls 30, 36 may be of the minimal height required to retain the glue 27. The spacer simultaneously supports the upper glue boards, spaces the glue of the two glue boards from contact, and serves as a barrier to dirt and debris infiltration between the joined boards.

The sleeve 24 is preferably formed from a narrow paperboard strip which is folded and glued to itself to define a closed rectangular strip which surrounds the dam outer walls 36 of a glue board 22. The size of the sleeve 24 is preferably such that it engages the dam outer walls 36 in a friction fit, although not so tight as to hinder separation by hand. The sleeve has an upper edge 54, and a lower edge 56 which engage the glue boards 22. The dam outer walls 36 are hence preferably close to perpendicular to the rim 38.

As shown in FIG. 4, two glue boards 22 are prepared for shipment and storage by placing one glue board 22 over another glue board so that the second glue board is positioned in opposed relationship to the first glue board. When the two glue boards 22 are opposed to one another, the glue is prevented from adhering between the glue boards by the sleeve 24. The second glue board peripheral rim 38 engages the sleeve upper edge 54, while the first glue board peripheral rim engages the sleeve lower edge 56. The glue within the first glue board faces the glue within the second glue board, and the first and second quantities of glue are spaced from one another and prevented from contacting one another by the sleeve 24. The sleeve 24 is preferably about three times as high as the dam outer walls 36, so that the spacing between two glue boards 22 is approximately equal to the height of a glue board.

For bulk users of glue boards, such as professional exterminators, the double glue board assemblies 20 may be held together with an elastic band, a tape label, or similar looped connector, and packed in quantity in a carton. For retail sales to consumers, the double glue board assembly 20 is preferably packaged in a plastic wrapper or enclosure 58, shown in FIGS. 4, and 6. The wrapper 58 provides a convenient label location and provides additional protection against contact with the glue until a glue board is ready to be positioned for rodent entrapment. The two glue boards may be connected by an elastic band within the wrapper. As shown in FIG. 6, when a user is ready to place a glue board 22, the double glue board assembly 20 may be extracted from the wrapper 58, and the wrapper may be discarded.

In the packaged condition, shown in FIG. 4, the sleeves 24 serve a load-bearing function when multiple double glue board assemblies 20 are stacked one upon another in a carton. The paperboard sleeve 24 in one assembly 20 is generally overhead of the sleeve 24 in the underlying assembly 20. The sleeves 24 thus contribute to maintaining the integrity of the glue boards from distortion and bending, and shift loads away from the yieldable glue within the boards. The paperboard sleeves provide a means for supporting multiple glue boards, without transferring the loads to the dam inner or outer walls. The loads of multiple stacked glue board assemblies 20 are carried along the paperboard sleeves 24 and the rims 38, and the portions of the wrapper compressed between the assemblies 20.

Because of the pressure sensitive nature of the glue 27, it is undesirable to allow leaves, dust, lint, and other air borne contaminants, to come in contact with the glue surface prior to placement of the glue board. Hence the sleeve 24 blocks access to both glue boards, providing a cleaner glue surface when needed.

Figure 7:
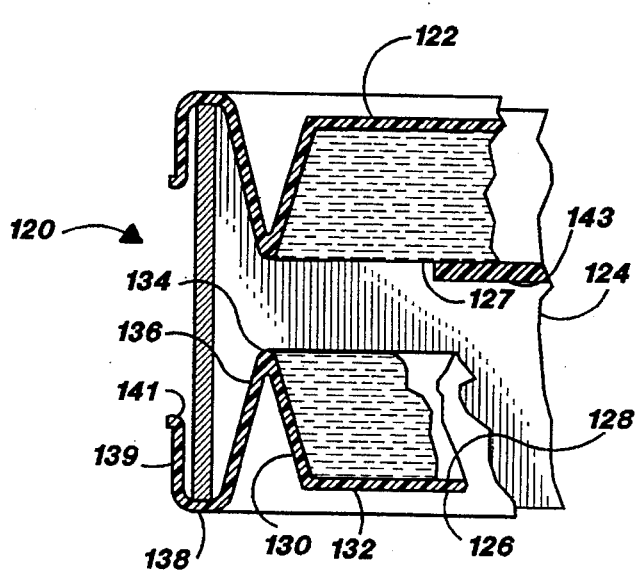
FIG. 7 is a fragmentary cross-sectional view of an alternative embodiment glue board assembly of this invention, having boards with upturned rim skirts.

An alternative embodiment glue board assembly 120, shown in FIG. 7, has glue boards 122 comprised of thermoformed thermoplastic boards 126 filled with hot melt glue 127. Each board 126 has an adhesive reservoir 128 which is defined between dam inner walls 130. The dam inner walls 130 extend upwardly from a board base wall 132 which underlies and supports the glue 127. The dam inner walls 130 are topped by a narrow peripheral lip 134. Dam outer walls 136 extend downwardly from the lip 134. A peripheral rim 138 extends outwardly from the dam outer walls 136. A skirt 139 extends upwardly from the rim 138 and is spaced outwardly from the dam outer walls 136. The skirt 139, the rim 138, and the outer walls 136 define a groove 141 which receives the paperboard sleeve 124 when two glue boards 122 are connected. The skirt 139 helps to restrict outward displacement of the sleeve 124 and assists in retaining the integrity of the assembly 120. The skirt 139 and the sleeve also create a type of labyrinth seal around the glue reservoir 128 limiting the infiltration of dust and debris.

Also as shown in FIG. 7, the glue board 120 may have a thin paper or plastic disc 143 set on the surface of the glue 127 within the reservoir 128. This disc 143 provides additional insurance that the glue of one glue board 126 will not come into contact with the glue of the underlying glue board 126.

It should be noted that although the glue boards have been illustrated as rectangular, square, polygonal, or other geometric shapes may also be provided. Furthermore, the glue contained within the glue boards may be scented or provided with other attracting features to encourage rodent advancement onto the entrapping glue. Various other reinforcing rib arrangements may be employed other than the illustrated arrangement.

It is understood that the invention is not limited to the particular construction and arrangement of parts herein illustrated and described, but embraces all such modified forms thereof as come within the scope of the following claims.

We claim:

1. A multiple rodent glue board assembly, comprising:
   a) a first board having a glue reservoir defined by dam inner walls which extend upwardly from a reservoir base wall, and having dam outer walls which extend downwardly from the dam inner walls, and a peripheral rim extends sidewardly from the dam outer walls;
   b) a first quantity of glue contained within the first board glue reservoir;
   c) a sleeve which surrounds the first board glue reservoir and which has a lower edge which engages the first board peripheral rim, the sleeve extending upwardly above the first board to define an upper edge;
   d) a second board having a glue reservoir defined by dam second inner walls which extend from a second reservoir base wall, and having second dam outer walls which extend from the second inner walls, and a second peripheral rim extends sidewardly from the second outer walls;
   e) a second quantity of glue contained within the second board glue reservoir, and the second board is positioned in opposed relationship to the first board such that the second board second peripheral rim engages the sleeve upper edge, and the glue within the second board faces the glue within the first board and the first and second quantities of glue are spaced from one another and prevented from contacting one another by the sleeve.

2. The assembly of claim 1 further comprising a flexible wrapper which surrounds the assembly of the first board, the second board, and the sleeve, wherein the wrapper is sealed to retain the first board with the second board.

3. The assembly of claim 1 wherein the first board peripheral rim is below the level of the first board reservoir base wall.

4. The assembly of claim 1 further comprising a peripheral skirt which is spaced outwardly from the dam outer walls and which extends upwardly from the first board peripheral rim, the skirt being positioned outwardly of the sleeve lower edge, and serving to restrict outward displacement of the sleeve.

5. The assembly of claim 1 further comprising a thin disc adhesively attached to the first quantity of glue and facing the second quantity of glue.

6. The assembly of claim 1 wherein the sleeve provides a means for supporting multiple assemblies such that the weight of the supported assemblies is substantially borne by aligned sleeves and engaged rims in compression.

7. A packaged assembly of two glue boards comprising:
   a) two glue boards, each having a thermoformed thermoplastic board with portions which define a glue reservoir have a base wall and adhesive glue disposed within the reservoir, wherein each board has outer generally vertical side walls, and a rim extending outwardly from the side walls; and
   c) a sleeve which is positioned between the two glue boards, wherein the sleeve extends around the glue reservoirs of the glue boards, and wherein the sleeve has a lower edge which engages the rim of one of the glue boards, and an upper edge which engages the rim of the other of the glue boards, wherein one glue board is positioned in opposed relationship to the other glue board by the sleeve such that the glue contained within the two glue boards is prevented from contacting by the sleeve.

8. The assembly of claim 7 further comprising a looped member which extends around the two glue boards and the sleeve to retain the assembly together.

9. The assembly of claim 7 further comprising thermoformed means formed on each board for restraining warping of the board.

10. The assembly of claim 7 wherein the sleeve provides means for structurally supporting one glue board above another glue board, and the sleeve also provides a means for preventing infiltration of dirt and debris between connected glue boards.

* * * * *